United States Patent [19]

Wang

[11] Patent Number: 5,280,709
[45] Date of Patent: Jan. 25, 1994

[54] COOLING CONDENSER SYSTEM FOR PROCESSING OILY SMOKE AND CHEMICAL EVAPORATION

[76] Inventor: Yiu-Te Wang, No. 65, Alley 1, Lane 230, Chung Cheng Road, Ta Lin Chen, Chiayi Hsien, Taiwan

[21] Appl. No.: 881,284

[22] Filed: May 11, 1992

[51] Int. Cl.⁵ .......................... F25J 3/00; F23J 15/00; B01D 5/00; B01D 53/00
[52] U.S. Cl. .......................... 62/36; 62/11; 55/269
[58] Field of Search .............. 62/36, 11; 55/23, 80, 55/269

[56] References Cited

U.S. PATENT DOCUMENTS

| | | | |
|---|---|---|---|
| 1,905,053 | 4/1933 | Powell | 55/23 X |
| 3,282,334 | 11/1966 | Stahlheber | 62/36 |
| 3,824,767 | 7/1974 | Ford | 55/80 X |
| 4,285,709 | 8/1981 | Gram | 62/36 |
| 4,682,990 | 7/1987 | Kagstrom et al. | 55/269 X |
| 4,704,972 | 11/1987 | Marchand | 55/269 X |
| 4,726,819 | 2/1988 | Michimae et al. | 55/269 X |
| 4,957,520 | 9/1990 | Parmentier et al. | 55/269 |
| 5,030,258 | 7/1991 | Kisaragi et al. | 55/269 X |

FOREIGN PATENT DOCUMENTS

| | | | |
|---|---|---|---|
| 2654253 | 6/1978 | Fed. Rep. of Germany | 55/23 |
| 2648055 | 12/1990 | France | 55/269 |
| 52413 | 7/1920 | Sweden | 55/23 |
| 182803 | 10/1923 | United Kingdom | 55/23 |

Primary Examiner—Henry A. Bennet
Assistant Examiner—Christopher B. Kilner
Attorney, Agent, or Firm—Bacon & Thomas

[57] ABSTRACT

A cooling condenser system adapted especially for processing oily smoke and chemical evaporation includes a motor; a crank shaft to which are connected a number of compression pistons reciprocally operated in corresponding cylinders so as to deliver exhaust air to a cooling condenser; a plurality of exhaust inlet ducts each selectively communicating with a respective cylinder via a first check valve; a plurality of outlet ducts each selectively communicating with a respective cylinder via a second check valve that are led to openings of a cooling condenser and a pressure controlled valve in association with a filter screen disposed at the outlet of the cooling condenser through which the processed exhaust can be discharged to the surroundings. A hot/cold air generator is connected to the cooling condenser and can blow hot or cold air into the condenser and also send hot or cold air to the first and second check valves assembly. A number of collector pans collect the condensed products.

3 Claims, 3 Drawing Sheets

COOLING CONDENSER SYSTEM FOR PROCESSING OILY SMOKE AND CHEMICAL EVAPORATION

BACKGROUND OF THE INVENTION

The present invention relates to a cooling condenser system for processing exhaust air containing oily smoke or chemical evaporation which will be filtered first and then discharged into the surroundings so as to prevent the environment from being polluted and the by-products obtained from the processed exhaust can be recycled for further use. The exhaust air containing oily smoke or chemical evaporation is first delivered to a cooling condenser with a fixed pressure and the temperature of the condenser can then be varied by blowing in hot or cold air produced by a hot/cold air generator so as to condense a solid accumulation within the condenser tubes of the cooling condenser. The condensed material is then discharged to collector pans for recycling purposes. The cleansed air is finally forced through a filter screen via a pressure controlled valve and then discharged to the atmosphere.

Pollution prevention and material recycling have been two major concerns for the environment oriented industries in the past decades around the world. The idea of "a penny saved is a penny earned" is widely applied to the management philosophy of many efficient factories.

There are many restaurants which daily discharge oily smoke with an irritating smell from their kitchens into the atmosphere, or into the sewers, resulting in serious air and water pollution.

The present inventor has noticed the annoying problem and come up with a solution by designing a novel cooling condenser system which can effectively filter oily smoke and chemical evaporation which is then collected for recycling use or further processing.

SUMMARY OF THE INVENTION

The primary object of the present invention is to provide a cooling condenser system for processing oily smoke or chemical evaporation, which can condense the impurities in the exhaust air into liquid form, or make the solidified accumulation in the condenser tubes melt by application of hot air. The liquefied material can flow downward to collector pans and then is recycled for use or is discarded to a proper dump.

Another object of the present invention is to provide a cooling condenser system which is particularly applicable to a restaurant, hotel or chemical factory to process the discharged exhaust therefrom to prevent the surroundings from being polluted.

One further object of the present invention is to provide a cooling condenser system which is able to be expanded by selective addition of a number of cooling condensers.

BRIEF DESCRIPTION OF THE DRAWINGS

To make the features, operation modes and the structure of the present invention better understood, a number of drawings are given in company with a detailed description of the preferred embodiment thereof, in which.

DETAILED DESCRIPTION OF THE PREFERRED EMBODIMENT

Figure 1:
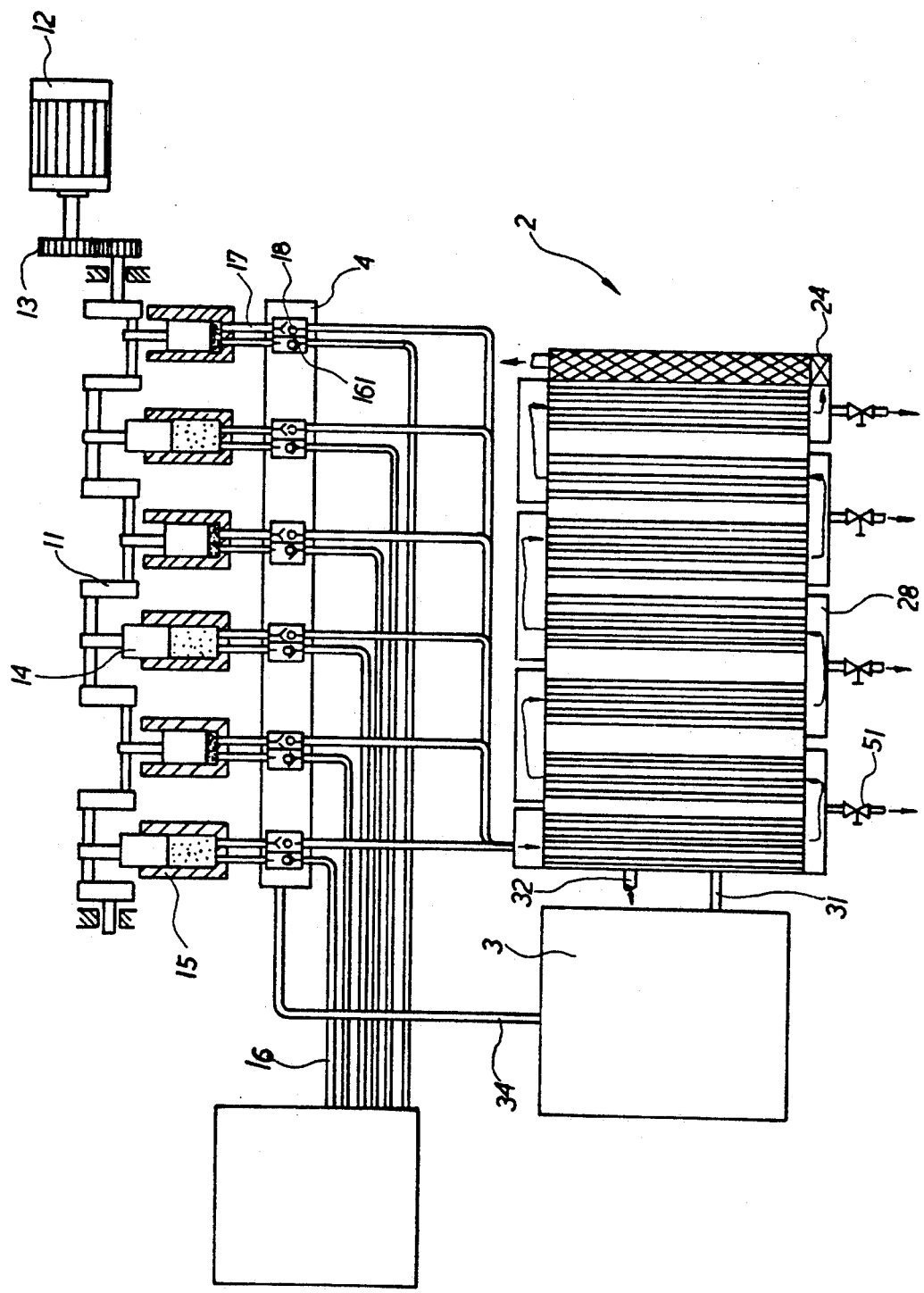
FIG. 1 is a schematic diagram showing the assembly of the present invention.
Figure 2:
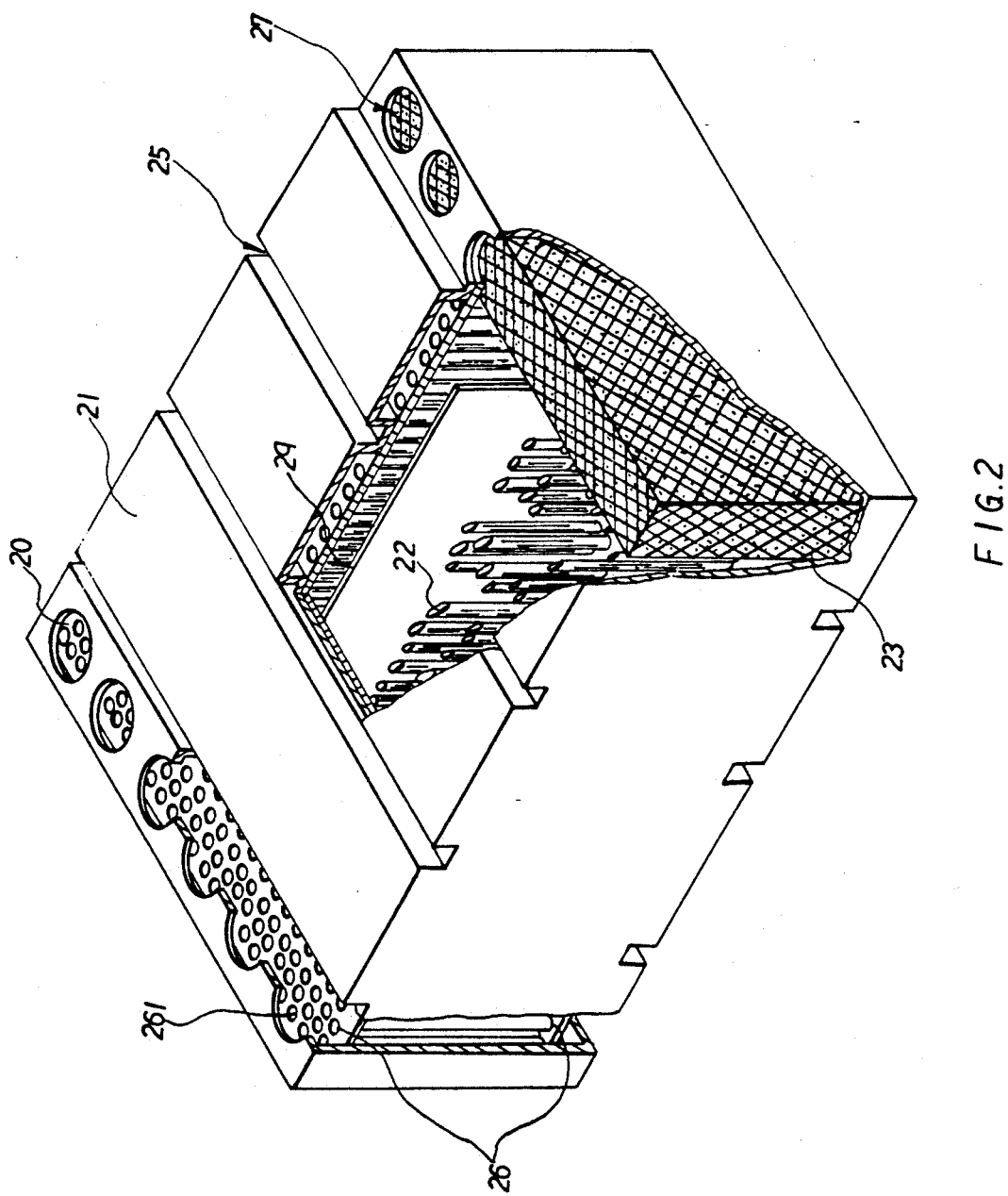
FIG. 2 is a perspective view, partially cut away, showing the structure of a condenser of the present invention.

Referring to FIGS. 1, 2, the present invention comprises a crankshaft 11 driven by a motor 12 by way of a gear assembly 13 and a plurality of compression pistons 14 connected to the crankshaft 11 and reciprocally operating inside a plurality of corresponding cylinders 15 each of which is in selective communication with an air inlet duct 16 and an outlet duct 17 via a first check valve 161 and a second check valve 18 respectively; a condenser 2 coupled to the outlet ducts 17; and a hot/cold air generator 3 which is connected to the condenser 2 and to an elongated box 4 accommodating the first and second check valves 161, 18.

The condenser 2 is comprised of an outer shell 21, a plurality of vertical condenser tubes 22, a filter screen 23, and a pressure controlled valve 24 wherein the outer shell 21 is a parallelepiped, on the top and bottom planes thereof are disposed a number of parallel grooves 25 respectively. The grooves 25 on the top plane are disposed in such a manner that each groove thereof is located between two grooves 25 on the opposite bottom plane. A pair of horizontal plates 26 are located adjacent to the undersides of the grooves 25. The horizontal plates 26 are provided with a plurality of aligned through holes 261 so that a number of vertical condenser tubes 22 can be disposed therebetween. The filter screen 23 disposed at one side of the condenser 2 is in communication with the atmosphere via a number of ventilation openings 27 defined on both the top plane of the outer shell 21 and the top horizontal plate 26. A vertically disposed partition board 29 is disposed in a direction perpendicular to the grooves 25 between the two horizontal plates 26.

A hot/cold air generator 3 for supplying hot or cold air is equipped with a supply duct 31, a return duct 32 and a heating duct 34. The supply duct 31 comes in the condenser 2 from one side thereof and the blown-in air flows through the area between the two horizontal plates 26 and one side of the partition board 29, to the other side thereof and is discharged via the return duct 32 into the air generator 3. The heating duct 34 is coupled to the elongated box 4 in which the first and second check valves 161, 18 are housed.

In practical operation, the motor 12 drives the gear 13 to make the crankshaft 11 rotate so that the pistons 14 connected to the crankshaft 11 can reciprocally operate inside the cylinders 15. As a result of the operation of the pistons 14, the exhaust air containing oily smoke or chemical evaporation can be drawn into the cylinders 15 from the air inlet ducts 16 via the first check valves 161 and compressed by the pistons 14 so as to be discharged therefrom into the outlet ducts 17 and further led to, via the second check valves 18, to the condenser 2.

As shown in FIG. 2, the exhaust air discharged from the pistons 14 is led into the condenser 2 through the openings 20 and further into the condenser tubes 22 through the aligned through holes 261. As is described in the preceding paragraphs, the horizontal plates 26 are in securing attachment to the undersides of the grooves 25 of the top and bottom planes of the outer shell 21 of the condenser 2 respectively; and the grooves 25 on the top plane are arranged out of alignment with the grooves 25 disposed on the opposite bottom plane of the condenser, with each groove 25 on the top plane disposed between every two grooves 25 on the opposite bottom plane whereby the exhaust air can be circulated from top to bottom all over the condenser 2 through the condenser tubes 22 and finally reaches the pressure controlled valve 24.

The exhaust air is continually compressed into the condenser 2 by the compression pistons 14, and is stopped at one end by the second check valves 18 and restrained at the other end by the pressure controlled valve 24. Therefore, the exhaust air confined in the condenser 2 is under a certain fixed pressure. Meanwhile, the hot/cold air generator 3 delivers cold air into the condenser 2 by way of the supply duct 31 and the cold air flows around all the condenser tubes 22 with the help of the vertical partition board 29. Thereby the exhaust air containing oily smoke and chemical evaporation will become condensed in the condenser tubes 22 and the condensed substance will adhere to the inner surfaces of the tubes 22 and move downward slowly therealong to the bottom and into the collector pans 28. The collected substance is able to be discharged through the gate valves 51 disposed under the collector pans for recycling.

When the pressure in the condenser 2 is in excess of that the pressure controlled valve 24 can stand, the valve 24 will be opened and the air will be discharged via the filter screen 23 and the ventilation openings 27 into the surroundings. In case the condenser tubes are blocked by the solid greasy substance over a period of time, and the condensed substance is not able to flow through the tubes 22, the exhaust air will be stopped from entering the condenser 2 and the hot/cold air generator 3 will begin to blow hot air to the condenser tubes 22 to melt the blocking greasy substance such that it will drip into the collector pans 28. Moreover, when the first and second check valves 161, 18 are blocked by solid greasy substance, the hot air can be also delivered to the box 4 in which the first and second check valves are housed so as to melt the solid accumulation therein and make the valves work normally without blockage.

The processing of chemical liquids is substantially the same as that of the above oily smoke. The only difference lies in the application of neutralizing agents on the filter screen 23 so as to avoid the discharge of unacceptable chemicals into the air. The condensed chemicals can be collected in the collector pans and recycled for further use. The number of cylinders 15 and the condenser tubes can be selectively increased according to the quantity of the discharged oily smoke and chemical evaporation.

Figure 3:
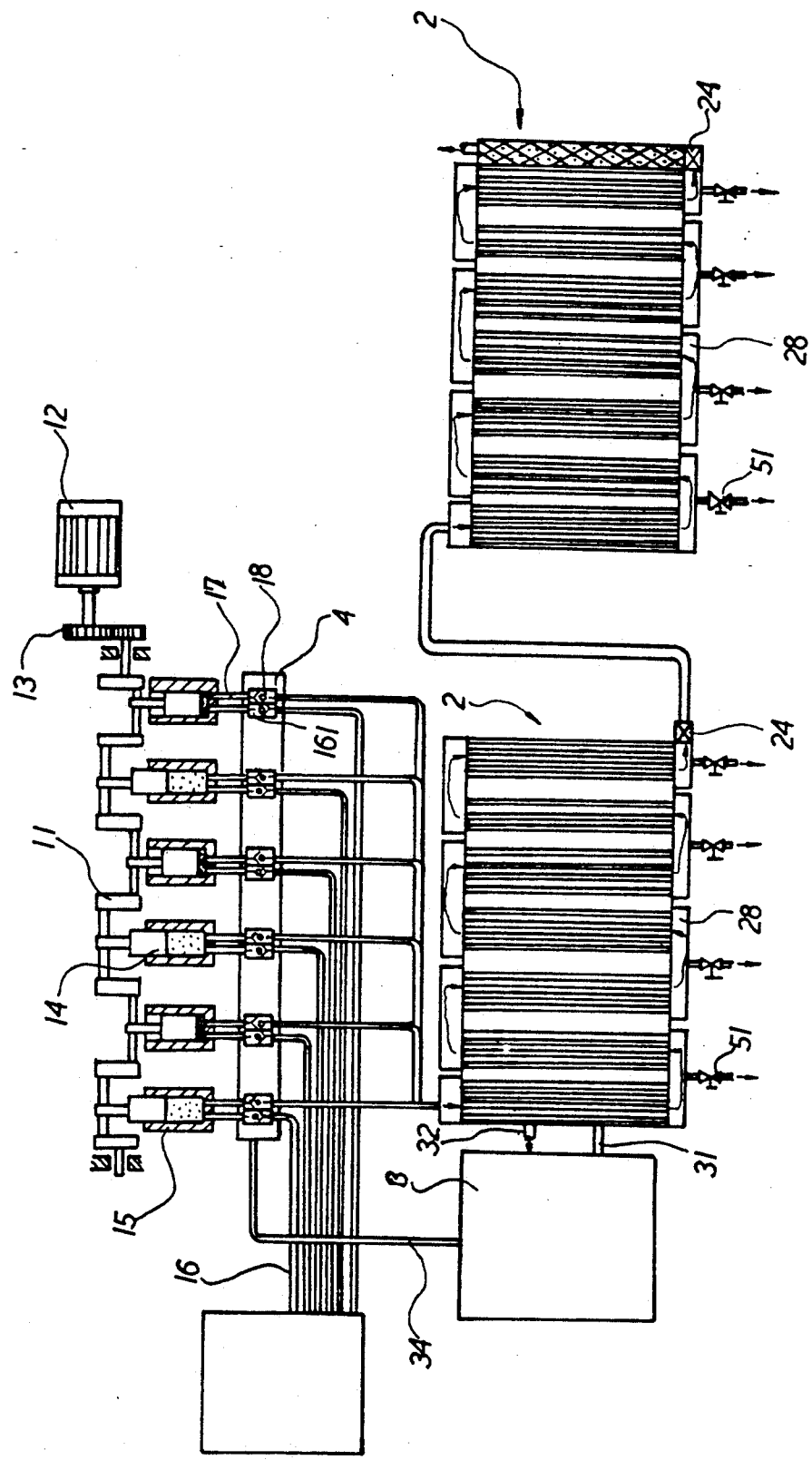
FIG. 3 is a schematic diagram showing the addition of a condenser to the present system.

The number of condensers 2 can also be increased. For instance, one or two additional condensers can be attached to the original condenser 2 as shown in FIG. 3 so as to improve filtration of the exhaust air via condensation.

I claim:

1. A cooling condenser system for processing polluted exhaust air containing oily smoke and chemical evaporation, comprising:
   a) a power means;
   b) a gear means engaged with said power means;
   c) a crankshaft driven by said power means by way of said gear means;
   d) a plurality of compression pistons coupled to said crankshaft and each reciprocally disposed in a cylinder;
   e) a first check valve connected to each said cylinder so as to allow polluted air to flow into said cylinder;
   f) a second check valve connected to each said cylinder so as to allow compressed polluted air to flow out of said cylinder;
   g) a plurality of air inlet ducts each coupled to said first check valve and in selective communication with one of said cylinders;
   h) a plurality of outlet ducts each coupled to said second check valve at a first end and in selective communication with one of said cylinders, and having a second end;
   i) a condenser having:
      i) an outer shell provided with a top and bottom planes which define a plurality of parallel grooves, the grooves in one plane facing and being offset with respect to the grooves in the other plane; opposite sides of said top plane defining a plurality of openings respectively, the openings on a first side thereof being in communication with said second end of said outlet ducts;
      ii) a pair of horizontal plates defining a plurality of aligned through holes secured to facing sides of said top and bottom planes of said outer shell;
      iii) a filter screen disposed on a second side of said condenser in communication with said openings defined on the second side of said top plane;
      iv) a generally vertical partition board extending between said pair of horizontal plates generally perpendicular to said parallel grooves so that hot/cold air can flow through said condenser;
      v) a plurality of condenser tubes extending between said horizontal plates in engagement with said aligned holes therein; and,
      vi) a plurality of collector pans disposed under said condenser with a gate valve associated with each said collector pan; and,
   j) a hot/cold air generator having a supply duct and a return duct that are connected to said condenser and a heating duct that is connected to an elongated box in which are housed said first and second check valves.

2. A cooling condenser system as claimed in claim 1 further comprising a pressure controlled valve operatively associated with the filter screen of the condenser so as to open when pressure in said condenser is in excess of a predetermined value.

3. A cooling condenser system as claimed in claim 1 further comprising a plurality of condensers operatively connected together so as to better filter the exhaust air containing oily smoke or chemical evaporation.

* * * * *